Patented Sept. 12, 1939

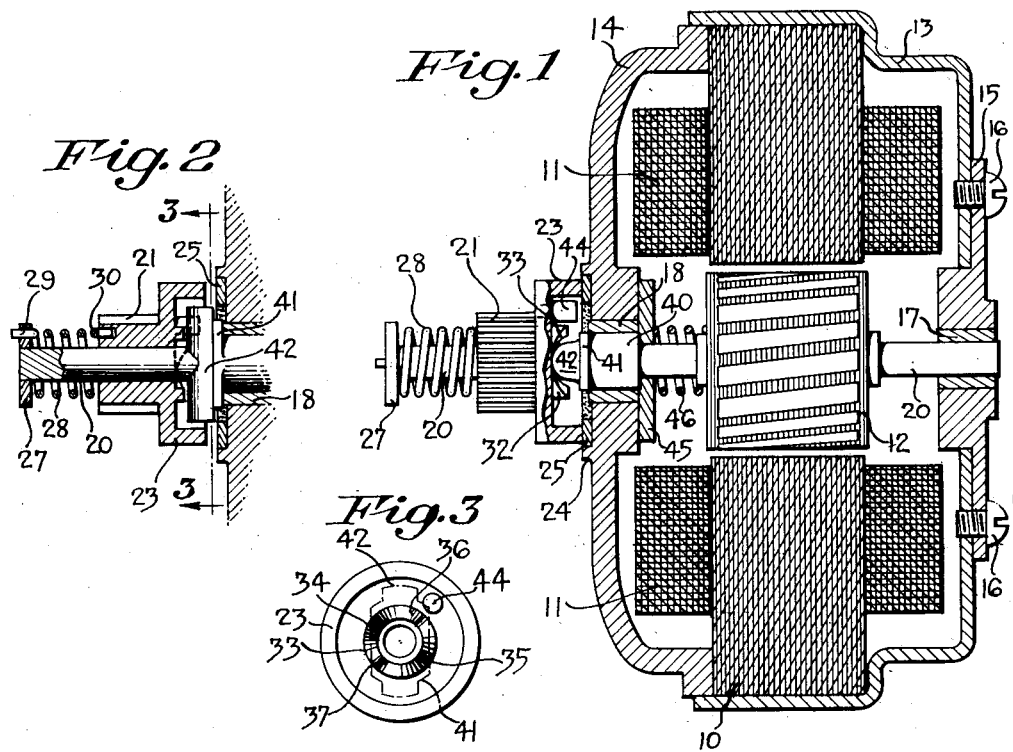

2,172,440

UNITED STATES PATENT OFFICE 2,172,440

AUTOMATIC BRAKE FOR MOTOR SHAFTS

William H. Edmondson, Minneapolis, Minn., assignor to Minneapolis-Honeywell Regulator Company, Minneapolis, Minn., a corporation of Delaware Application November 18, 1936, Serial No. 111,409

9 Claims. (Cl. 192—8)

This invention relates to a motor and more particularly to one provided with a brake which is immediately effective upon the motor being rendered inactive.

An object of the present invention is to provide a motor having an automatic brake with mechanical means for rendering the brake ineffective upon initial rotation of the motor.

A further object of the present invention is to provide a motor having an automatic brake and cam means for rendering the brake ineffective upon initial rotation of the motor.

A further object of the invention is to provide a motor having an automatic brake and cam means for rendering the brake ineffective during running of the motor, in which the motor drives through a yieldable connection and the brake is released during the initial movement required to tension the yieldable connection.

Other objects of the invention will become apparent from a consideration of the accompanying specification, claims and drawing.

For more thorough understanding of the invention, reference is made to the accompanying drawing in which:

Figure 1 is a view partly in section of the improved motor of my control system;

Figure 2 is a section through the brake actuating mechanism of the motor taken at right angles to the section of Figure 1, and Figure 3 is a detailed view of one pinion gear member of the motor.

Referring to the drawing, the stator of the motor is designated by the reference numeral 10. The stator may be of any suitable form depending upon the type of motor which it is desired to employ. In the particular case, the stator may be of a type including a plurality of pole pieces on each of which is a coil 11 of the field winding. The motor illustrated is of the reversible induction type and the rotor 12 is of the squirrel cage type. Secured together and to the stator are housing members 13 and 14 serving to house the operating portions of the motor. Secured to housing member 13 is a closure plate 15, the closure plate being fastened to housing member 13 by screws 16 or other suitable fastening means. Located in the closure plate 15 is a bushing 17. A similar bushing 18 is located in the housing member 14. The rotor 12 is secured upon a shaft 20 which is rotatably journaled in the bushings 17 and 18. The shaft 20 extends outwardly through the casing 14 and slidably and rotatably mounted on the outwardly extending portion of shaft 20 is a pinion gear member 21. Projecting from the gear portion proper of this member 21 is a cylindrical extension 23. The housing member 14 is provided with a circular ridge 24 and retained within this circular ridge is an annular disc 25 of suitable friction material. The cylindrical extension 23 of member 21 is designed to cooperate with the annular member 25 of friction material to provide a braking action as will be more apparent from the subsequent description. Rigidly secured to the outer end of shaft 20 is a collar 27. A spring 28 is located between collar 27 and the pinion gear member 21. This spring serves to bias pinion gear member 21 in the direction of housing member 14 urging the cylindrical extension 23 into engagement with the friction material 25. The opposite ends of spring 28 are bent outwardly, as at 29 and 30, and extend into the collar 27 and the pinion gear member 21, as best shown in Figure 2. The spring 28 thus not only serves to effect the relatively longitudinal position of member 21 and shaft 20 but to also effect the relative angular position of these members, as will be explained subsequently in more detail.

Within the cylindrical extension 23 of member 21 is a cylindrical shell 32 whose outer edge is formed with a cam surface 33. The cam surface 33 is undulating and is provided with two recessed portions 34 and 35 which form low dwells of the cam, as best shown in Figure 3. From either of these two low dwell points 34 and 35, the cam surface rises, the high points thereof being indicated by the reference numerals 36 and 37 in Figure 3. The shaft 20 is provided with an enlarged collar portion 40 where it extends through the bushing 18. Secured to the shaft 20 abutting the collar portion 40 is a flat substantially rectangular member 41. This member serves to bear against the bushing member 18 (Figure 2) and limit the movement of the shaft 20 in one direction. Secured to the shaft 20 and to member 41 is a second rectangular member 42 whose cross section is substantially semi-elliptical in form, as indicated in Figure 1. Member 42 is designed to cooperate with cam surface 33 of member 32. A pin 44 is adapted to be engaged by the member 42 and is provided to limit the movement of member 42 rotatively relative to the cam.

Loosely mounted within the housing 14 upon the shaft 20 is a collar member 45 of some suitable bearing material. Between this collar member 45 and the rotor 12 a spring 46 is interposed. The spring 46 serves to yieldably hold rotor 12 in position and to prevent movement of the latter in the direction of the pinion gear member 21. Obviously, if some means were not provided for restraining the movement of rotor 12 to the left, the entire structure including shaft 20, pinion gear member 21 and spring 28 would move away from the braking surface 25.

Operation

The operation of the motor can now be explained. As the members are shown in Figure 1, the member 42 is resting in the low dwells of cam surface 33. This permits the cylindrical extension 23 to engage the annular braking surface 25. The spring 28 serves to urge extension 23 against the braking surface 25 so that by the combined action of braking surface 25 and the braking surface afforded by the end extension, the motor is substantially prevented from rotation. As soon as the motor is energized, the rotor 10 is subjected to a force tending to turn the same. The initial turning movement of rotor 10 and consequently shaft 20 results in a tensioning of spring 28 inasmuch as the pinion gear 21 is effectively prevented from movement by reason of being connected to a gear train. The result is that shaft 20 is moved angularly relative to member 21 and consequently member 42 is moved angularly relative to the cam surface 33. The angular movement of member 42 relative to the cam surface 33 results in member 21 being pushed out longitudinally of shaft 20 and causes cylindrical extension 23 to be moved out of engagement with the disc 25. The braking surfaces are now separate and as soon as the spring 28 is sufficiently tensioned to permit rotation of pinion gear 21 and consequent movement of the entire load, the apparatus driven by the motor will be placed in operation.

The relative position of the parts during operation of the motor is shown in Figures 2 and 3. As will be noted particularly from Figure 3, the member 42 is contacting a relatively high portion of the cam surface 33 although not quite in engagement with pin 44. Under normal conditions, the shaft 20 will drive entirely through the spring 28. Pin 44, however, is provided so that under exceptionally heavy load conditions, there is no danger of the member 42 riding over the high point of cam 34 and down on to the next low dwell.

After the motor has started in the manner just explained, it will continue to rotate and by reason of driving through spring 28 will continue to maintain member 21 outwardly sufficiently to cause separation of the braking surfaces. As soon, however, as the motor is deenergized, the torque exerted upon rotor 12 will be eliminated, the only force acting to turn rotor 12 will be that due to the inertia of this member. Moreover, the gear train itself will have a certain amount of inertia with the result that there is very little relative driving action exerted by shaft 20 upon pinion gear member 21. The driving action will be so slight that spring 28 is effective to move member 21 angularly in the opposite direction with respect to the member 42 to again restore the members 21 and 42 to the relative positions shown in Figure 1. From the foregoing operation it will be seen that as soon as the motor is deenergized, the spring 28 is effective to so move members 42 and 21 relative to each other so that the extension 23 of member 21 will be urged into engagement with the braking disc 25 and be effective to prevent rotation of pinion gear 21. Immediately upon energization of the motor, however, the initial movement of shaft 20 causes the member 42 to move relative to cam surface 33 to separate the two braking members and permit rotation of pinion 21 as soon as spring 28 has been sufficiently tensioned to exert the force necessary to drive the pinion member.

The operation which has just been described is the same regardless of which direction the motor is driven. This is true since the spring 28 is under no tension in the position shown in Figure 1. Any movement of member 42 with respect to member 21 is resisted by compression spring 28 regardless of which direction the movement is in. The spring, moreover, is effective to return the member 42 to the low point of the same regardless of which direction the motor has revolved.

While I have shown a specific embodiment of my invention, it is to be understood that this is for purposes of illustration only and that my invention is to be limited only by the scope of the appended claims.

I claim as my invention:

1. In a reversible motor, a driving shaft, a relatively stationary member, a rotatable member carried by said shaft, cooperating braking surfaces on said members, yieldable means forming a driving connection between said shaft and said rotatable member and operative to bias said rotatable member into braking engagement with said stationary member, and cam means effective upon initial rotation of said motor in either direction to move said braking surfaces out of engagement with each other.

2. In a reversible motor, a driving shaft, a relatively stationary member, a member carried by said shaft, a yieldable connection between said shaft and said member, cooperating braking surfaces on said members, biasing means for normally biasing said members into braking engagement with one another, and cooperating elements carried by said shaft and said member carried by said shaft, said elements being effective upon initial rotation of said motor in either direction to move said braking surfaces out of engagement with each other.

3. In a reversible motor, a driving shaft, a relatively stationary member, a member carried by said shaft, a yieldable connection between said shaft and said member, cooperating braking surfaces on said members, biasing means for normally biasing said members into braking engagement with one another, and cam means effective upon initial rotation of said motor in either direction to move said braking surfaces out of engagement with each other.

4. In a reversible motor, a driving shaft, a relatively stationary member, a rotatable member carried by said shaft, cooperating breaking surfaces on said members, yieldable means forming a driving connection between said shaft and said rotatable member and operative to bias said rotatable member into braking engagement with said stationary member, and cooperating cam members on said shaft and said rotatable member effective upon initial rotation of said shaft in either direction to move said braking surfaces out of engagement with each other.

5. In a reversable motor, a driving shaft, a relatively stationary member, a pinion gear member carried by said shaft, cooperating braking surfaces on said members, yieldable means forming a driving connection between said shaft and said pinion gear member and operative to bias said pinion gear member into braking engagement with said stationary member, and cooperating cam members on said shaft and said pinion gear member effective upon initial rotation of said shaft in either direction to move said braking surfaces out of engagement with each other.

6. In a reversible motor, a stator, a rotor, a housing, a shaft supporting said rotor and rotatably supported in said housing, a pinion gear loosely mounted on said shaft, resilient means forming a driving connection between said pinion gear and said shaft, braking surfaces carried by said pinion gear and said housing, said resilient means being effective to urge said pinion gear in the direction of said housing and to urge said braking surfaces into engagement with each other, and cooperating cam members carried by said pinion gear and by said shaft, said cam members being effective upon initial rotation of said shaft in either direction prior to the torsioning of said resilient means to move said braking surfaces out of engagement.

7. In a motor, a stator, a rotor, a housing, a shaft supporting said rotor and rotatably supported in said housing, a pinion gear loosely mounted on said shaft, resilient means forming a driving connection between said pinion gear and said shaft, braking surfaces carried by said pinion gear and said housing, said resilient means being effective to urge said pinion gear in the direction of said housing and to urge said braking surfaces into engagement with each other, means for restraining movement of said rotor in the direction of said pinion gear, and cooperating cam members carried by said pinion gear and by said shaft, said cam members being effective upon initial rotation of said shaft prior to the torsioning of said resilient means to move said braking surfaces out of engagement.

8. In a motor, a stator, a rotor, a housing, a shaft supporting said rotor and rotatably supported in said housing, a pinion gear loosely mounted on said shaft, resilient means forming a driving connection between said pinion gear and said shaft, members having braking surfaces secured to said pinion gear and to said housing, said resilient means being effective to urge said pinion gear in the direction of said housing and to urge said braking surfaces into engagement with each other, yieldable means for restraining movement of said rotor in the direction of said pinion gear, and cooperating cam members carried by said pinion gear and by said shaft, said cam members being effective upon initial rotation of said shaft prior to the torsioning of said resilient means to move said braking surfaces out of engagement.

9. In a reversible motor, a stator, a rotor, a housing, a shaft supporting said rotor and rotatably supported in said housing, a pinion gear loosely mounted on said shaft and connected through a lost motion connection to said shaft, braking surfaces carried by said pinion gear and said housing, resilient means effective to urge said pinion gear in the direction of said housing and to urge said braking surfaces into engagement with each other, and cooperating cam members carried by said pinion gear and by said shaft, said cam members being effective upon initial rotation of said shaft in either direction prior to the taking up of said lost motion to move said braking surfaces out of engagement.

WILLIAM H. EDMONDSON.